United States Patent
Chan et al.

(10) Patent No.: US 10,453,207 B2
(45) Date of Patent: Oct. 22, 2019

(54) METHOD AND SYSTEM FOR GLOBAL MOTION ESTIMATION AND COMPENSATION

(71) Applicant: VERSITECH LIMITED, Hong Kong (CN)

(72) Inventors: Shing Chow Chan, Hong Kong (CN); Zhong Liu, Baoding (CN)

(73) Assignee: VERSITECH LIMITED, Hong Kong (CN)

( * ) Notice: Subject to any disclaimer, the term of this patent is extended or adjusted under 35 U.S.C. 154(b) by 77 days.

(21) Appl. No.: 15/748,576

(22) PCT Filed: Aug. 1, 2016

(86) PCT No.: PCT/CN2016/092708
§ 371 (c)(1),
(2) Date: Jan. 29, 2018

(87) PCT Pub. No.: WO2017/020807
PCT Pub. Date: Feb. 9, 2017

(65) Prior Publication Data
US 2018/0218511 A1    Aug. 2, 2018

Related U.S. Application Data

(60) Provisional application No. 62/199,754, filed on Jul. 31, 2015.

(51) Int. Cl.
*H04N 19/00* (2014.01)
*G06T 7/579* (2017.01)
(Continued)

(52) U.S. Cl.
CPC .............. *G06T 7/579* (2017.01); *G06T 7/529* (2017.01); *H04N 19/527* (2014.11); *H04N 19/54* (2014.11)

(58) Field of Classification Search
CPC ........... G06T 7/579; G06T 7/529; G06T 9/00; H04N 19/527; H04N 19/51–583
See application file for complete search history.

(56) References Cited

U.S. PATENT DOCUMENTS 5,259,040 A * 11/1993 Hanna ................. G06K 9/209
                                                                 375/240.12
2013/0278727 A1 * 10/2013 Tamir ................. H04N 13/261
                                                                    348/47
(Continued)

FOREIGN PATENT DOCUMENTS

CN    101600113 A    12/2009
CN    102222344 A    10/2011
(Continued)

OTHER PUBLICATIONS

International Search Report in corresponding PCT Application No. PCT/CN2016/092708, dated Oct. 31, 2016.

*Primary Examiner* — Sean T Motsinger
(74) *Attorney, Agent, or Firm* — Leason Ellis LLP

(57) ABSTRACT

It is proposed a Method and System for Global Motion Estimation and Compensation. The system operates on two depth maps which contain a reference depth map and a current depth map as well as their associated texture images if available. The system executes four major steps which are feature detection (step 1), global motion compensation (GMC) (step 2), major moving objects (MMO) detection and the estimation of their motion parameters denoted as major motion parameters (MMPs) (step 3), and local motion compensation (LMC) of macroblocks or other coding/prediction units (step 4). The output of the system is the global motion parameters (GMPs), major moving objects (MMOs) and MMPs, the local motion vectors (LMVs), and the coding modes.

10 Claims, 6 Drawing Sheets

(51) Int. Cl.
*H04N 19/54* (2014.01)
*H04N 19/527* (2014.01)
*G06T 7/529* (2017.01)

(56) References Cited

U.S. PATENT DOCUMENTS

| | | | | |
|---|---|---|---|---|
| 2014/0118494 A1* | 5/2014 | Wu | ............................. | G06T 7/20 |
| | | | | 348/44 |
| 2014/0328387 A1* | 11/2014 | Puri | ....................... | H04N 19/176 |
| | | | | 375/240.02 |
| 2014/0341289 A1* | 11/2014 | Schwarz | .............. | H04N 19/597 |
| | | | | 375/240.16 |
| 2014/0341291 A1* | 11/2014 | Schwarz | .............. | H04N 19/597 |
| | | | | 375/240.16 |
| 2017/0353670 A1* | 12/2017 | Zimmer | ................... | H04N 5/247 |
| 2018/0218511 A1* | 8/2018 | Chan | ........................ | H04N 19/54 |

FOREIGN PATENT DOCUMENTS

| | | |
|---|---|---|
| CN | 102595025 A | 7/2012 |
| CN | 103428516 A | 12/2013 |
| CN | 103561267 A | 2/2014 |
| WO | WO 2015099816 A1 | 7/2015 |

\* cited by examiner

METHOD AND SYSTEM FOR GLOBAL MOTION ESTIMATION AND COMPENSATION

CROSS-REFERENCE TO RELATED PATENT APPLICATIONS

This application is a U.S. National Phase Application under 35 U.S.C. § 371 of International Patent Application No. PCT/CN2016/092708, filed Aug. 1, 2016, and claims the benefit of priority under 35 U.S.C. Section 119(e) of U.S. Application Ser. No. 62/199,754, filed Jul. 31, 2015, all of which are incorporated by reference in their entireties. The International Application was published on Feb. 9, 2017 as International Publication No. WO 2017/020807 A1.

FIELD OF THE INVENTION

This invention is concerned with the temporal and spatial prediction of sequences of depth maps, i.e., depth Videos, taken at one or more view points, (i.e., multi-view depth videos) for their efficient compression.

BACKGROUND OF THE INVENTION

Depth maps are images (or videos if taken at regular time interval) that record the distances of observable scene points from the optical point of a camera. They provide additional information to the associated color pixels in the color image or video taken at the same position by specifying their depths in the scene. One application of depth maps is to synthesize new views of the scene from the color image or videos (also referred to as texture). Depth maps can also be taken at adjacent spatial locations to form multi-view depth images or videos. Together with the texture or color videos, new virtual views around the imaging locations can be synthesized. See, S. C. Chan et al., "Image-based rendering and synthesis," *IEEE Signal Processing Magazine*, vol. 24, pp. 22-33, (2007) and Z. Y. Zhu et al., "Object-based rendering and 3D reconstruction using a moveable image-based system," *IEEE Trans. Circuits Syst. Video Techno.*, vol. 22 (10), pp. 1405-1419, (2012), both of which are incorporated herein by reference in their entirety. An example of a stereo view of a synthetic scene and its associated depth maps are shown in FIG. 1.

Depth maps are important in many applications, especially for generating multiple new views from color (or texture) videos for view synthesis and display of 3D content in stereo and autostereoscopic displays. State-of-the-art coding algorithms such as HEVC-3D usually rely on block-based motion estimation and compensation techniques using both the depth and texture videos for inter-frame and inter-view prediction. See, G. Tech et al., "3D-HEVC draft text 1," in *Proceedings of the 5th Meeting of Joint Collaborative Team on 3D Video Coding Extensions (JCT-3V)*, Document JCT3 V-EIOOJ, Vienna, Austria, and (August 2013).

The camera position is not explicitly estimated for compensation and realization of such global camera motion prediction/compensation usually requires considerable multiplications which makes real-time implementation complicated. It is important to be able to obtain a set of motion descriptors of the stationary and major moving objects in the scene from adjacent depth images over time (inter-frame) and/or over space (intra-view) under changes in camera position and focus. The improved prediction due to the global camera motion compensation and major object motion parameters will result in reduced prediction residuals to be encoded, and hence better coding efficiency. This also greatly reduces the bits required for coding motion vectors in macroblocks or prediction unit since only short local motion correction is required given the global motion predictors, which are coded just only once.

Efficient compression of multi-view depth map images and videos are therefore important for their efficient storage and transmission.

State-of-the-art coding algorithms as in the Tech article usually rely on block-based motion estimation and compensation techniques using both the depth and texture videos. The camera position is not explicitly estimated for compensation and realization of such global camera compensation usually requires considerable multiplications which makes real-time implementation complicated. It is important to be able to efficiently obtain a set of motion descriptors of the stationary and moving objects in the scene from adjacent depth images over time (inter-frame) and/or over space (inter-view) under changes in camera position and focus. By using these motion model parameters, the bits for coding the prediction residual and the additional motion vectors in each macroblocks or coding units can be greatly reduced, which improve the coding efficiency.

SUMMARY OF THE INVENTION

The invention relates to the use of an affine camera model to facilitate efficient estimation and realization of inter-frame global camera motion prediction and compensation of stationary or nearly stationary objects in depth videos. It also relates to an efficient method for estimating the associated global motion model parameters (GMPs) from consecutive frames of depth videos with or without the assistance of texture videos. The method performs the global camera compensation with significantly reduced arithmetic complexity to facilitate real-time or hardware implementation;

The invention further provides an efficient method for estimating and compressing the motion model parameters (MMPs) of major moving objects (MMO) in the scene from consecutive frames of depth videos with or without assistance of texture videos. It performs local motion estimation and deformation correction of macro blocks or other prediction units using the GMPs and appropriate MMPs as predictors. This significantly reduces the range and hence bits required for the local motion vectors. It also allows for inter-view prediction and compensation of multi-view depth videos with or without assistance from texture videos.

Another important feature of the invention is that good prediction performance can be achieved using only the depth videos. Therefore, the depth coding can be done independent of coding of the color videos. Consequently, the depth codec can support all existing hardware and software of video compression standards for performing view synthesis using the decoded videos.

Alternatively, the codec can utilize the color videos to further improve the accuracy of the estimated parameters with increased memory storage. Furthermore, the motion model parameters can be selectively exchanged between the texture and depth codec to improve the performance of motion estimation while reducing the range and hence bits required for the local motion vectors of macroblocks or other predicting units.

This invention also involves a series of efficient algorithms to achieve the above objectives with or without the assistance of color videos and it can work with different color video compression standards by utilizing only the decoded video frame for view synthesis.

The system for carrying out the invention includes four major steps, i.e., (1) feature detection, (2) global motion compensation (GMC), (3) major moving objects detection and (4) the estimation of their motion parameters denoted as major motion parameters (MMPs), and local motion compensation (LMC) of macroblocks or other coding/prediction units. The output of the system is the global motion parameters (GMPs), major moving objects (MMOs) and MMPs, the local motion vectors (LMVs), and the coding modes.

BRIEF DESCRIPTION OF THE DRAWINGS

The present invention can be more fully understood by the following detailed description of the preferred embodiments, with reference made to the accompanying drawings, wherein.

DETAILED DESCRIPTION OF EXEMPLARY EMBODIMENTS OF THE INVENTION

Figure 1A:
FIGS. 1(a) and (b) are respectively the texture and depth map taken at the left view point.
Figure 1B:
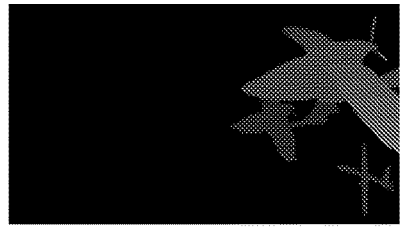
FIGS. 1(c) and 1(d) are respectively the texture and depth map taken at the right view point.
Figure 1C:
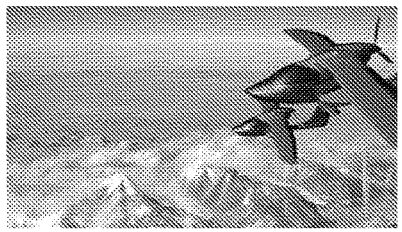
Figure 1D:
Figure 2:
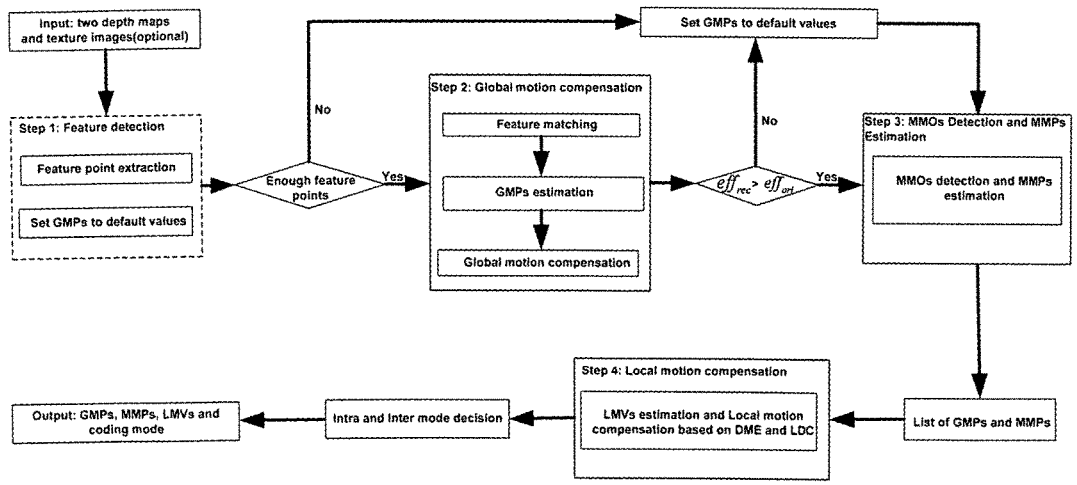
FIG. 2 is a schematic overview of the system of the present invention.

An overview of the proposed system for global and major objects motion estimation, compensation and depth compression is shown in FIG. 2. Given two depth maps which contain a reference depth map and a current depth map as well as their associated texture images if available, the system executes four major steps which are feature detection (step 1), global motion compensation (GMC) (step 2), major moving objects (MMO) detection and the estimation of their motion parameters denoted as major motion parameters (MMPs) (step 3), and local motion compensation (LMC) of macroblocks or other coding/prediction units (step 4). The output of the system is the global motion parameters (GMPs), major moving objects (MMOs) and MMPs, the local motion vectors (LMVs), and the coding modes as shown in FIG. 2.

Step 1—Feature Detection

In this step, the extract feature points on the current depth map and texture image (if available) are extracted by using a novel Ramer-Douglas-Peucker (RDP)-based method. The proposed RDP-based method efficiently utilizes a modified RDP algorithm for feature detection. Then all of the global motion parameters (GMPs) are set to the default values, which means no actual effect will be preserved by applying the default GMPs to an image. If the extracted feature point number is enough, the system will go through the global motion compensation step (step 2). Otherwise, it will skip step 2 and go directly to step 3 for major object parameter estimation and local motion compensation.

Step 2—Global Motion Compensation (GMC)

In step 2 an estimate is made of the GMPs from the input depth maps with or without texture images and GMC is performed for the current depth map. First, the corresponding feature points in the reference depth map and texture image (if available) are obtained using the conventional template matching method based on the feature points extracted in step I. Then the GMPs are estimated by using the MSAC method with the help of feature points of the depth map and texture image simultaneously (if the texture images are available) or feature points of depth map only (if the texture images are unavailable). See, P. H. Torr et al., "MLESAC: A new robust estimator with application to estimating image geometry," *Computer Vision and Image Understanding*, vol. 78, pp. 138-156, (2000), which is incorporated herein by reference in its entirety. With GMPs, the next step is to perform GMC on the reference depth map for estimating the depth values of the current depth map. It involves the update of imaging coordinates using the GMPs and the interpolation of the depth values located at the updated fractional coordinates. The realization of such GMC usually requires considerable multiplications, which makes real-time implementation complicated. To alleviate this problem, the present invention provides a new formulation for GMC, which allows a multiplier-less update of imagining coordinates and multiplier-less bilinear interpolation of the depth values. The global compensation will only be accepted if the effectiveness of the GMPs ($\text{eff}_{rec}$) is larger than that of the default frame differencing scheme ($\text{eff}_{ori}$). Otherwise, the GMPs are set to default values again.

Step 3—Major Moving Objects Detection and Major Motion Parameters Estimation

In this step, major moving objects (MMOs) are detected and their motion parameters are estimated. The MMOs are first detected by identifying the difference between the current depth map and the compensated depth map from the reference image.

Then the MMPs corresponding to the MMOs are estimated. To improve the compression ratio, the motion of the MMOs is represented using a set of representative major motion parameters (MMPs), which include vertical and horizontal shifts and depth scales. Hence, objects with a variety of possible motion types including translation, rotation and zoom in/out can be efficiently compensated. Until Step 3, a list of GMPs and MMPs estimated using depth maps can be obtained. If the corresponding texture videos are available, another list of GMPs and MMPs estimated using the texture videos in a similar way can be also obtained. The system allows the exchange of GMPs and MMPs obtained between texture and depth videos.

4) Step 4—Local Motion Compensation (LMC).

With the estimated GMPs and MMPs as well as the detected MMOs, most of the depth values of the current depth map can be effectively compensated from the reference depth map. However, the compensation can be further refined by dividing the current depth map into non-overlapping blocks and performing the proposed local motion correction (LMC). More precisely, the LMC is completed based on the discontinuity-aware motion estimation (DME) criterion and local deformation correction (LDC). The LMVs can be estimated and used for local correction. Furthermore, the bits used for the coding of the LMVs and the residual after local compensation will be measured and compared with the bits in the intra mode for an intra/inter mode decision.

Global Motion Models

The relationship between a 3D observed point with Cartesian coordinate (X,Y,Z) and its projection on the 2D image plane (x,y) is described by the camera model in the Hartley et al., "Multiple view geometry in computer vision," Cambridge University Press, (2003). Moreover, it also describes the relationship of the original projected 2D image point (x,y) and its new projected point (x',y') when the camera is moved to another position. This model is commonly used in computer vision for camera calibration and applications involving camera motion.

The Eight-parameter model, which describes a perspective transformation between the two image coordinates due to camera motion, is commonly used in computer vision. It can be further simplified to models with fewer parameters to suit various applications.

This innovation describes methods to estimate and efficiently implement simplified motion models from depth videos for efficient compression of depth maps by predicting the current depth image frame from those which have been compressed, i.e. inter-frame prediction. This is feasible because the changes in depth maps at adjacent time instants are very often coming from camera movement and moving objects. The methods described can be performed from the depth videos with or without the assistance of the texture videos and is also useful in other applications involving depth videos such as stabilization of depth videos, etc.

The model is usually defined in terms of the homogeneous coordinate of the corresponding image coordinate (x,y). The homogeneous coordinate of an image point p can be written as $(\tilde{x}, \tilde{y}, \tilde{w})$, and it describes a set of points which are identical to (x,y) after scaling by w, i.e., $(x,y)=(\tilde{x}/\tilde{w}, \tilde{y}/\tilde{w})$. The eight parameters model, which is also referred to as the perspective model, describes the homogeneous coordinates of the original image point (x, y, 1) and its corresponding image point at the new camera position by using the following linear transformation:

$$\begin{bmatrix} x'' \\ y'' \\ w'' \end{bmatrix} = \begin{bmatrix} m_0 & m_1 & m_2 \\ m_3 & m_4 & m_5 \\ m_6 & m_7 & 1 \end{bmatrix} \begin{bmatrix} x \\ y \\ 1 \end{bmatrix}. \quad (1)$$

By noting that $w''=m_6 x + m_7 y + 1$, the new Cartesian image coordinates (x', y') of the point (x,y) at the new camera position can be obtained by dividing (x'', y'') by w'' to obtain the following projective transformation $$\begin{cases} x' = \dfrac{m_0 x + m_1 y + m_2}{m_6 x + m_7 y + 1} \\ y' = \dfrac{m_3 x + m_4 y + m_5}{m_6 x + m_7 y + 1} \end{cases}. \quad (2)$$

If $m_6 = m_7 = 0$, (2) reduces to the affine model which is also called the six-parameter model, $$\begin{bmatrix} x' \\ y' \end{bmatrix} = \begin{bmatrix} m_0 & m_1 \\ m_3 & m_4 \end{bmatrix} \begin{bmatrix} x \\ y \end{bmatrix} + \begin{bmatrix} m_2 \\ m_5 \end{bmatrix}. \quad (3)$$

Furthermore, by setting $m_0=m_4=1$ and $m_1=m_3=m_6=m_7=0$, the perspective model reduces to the pure translation model with two parameters, which is frequently used in video coding.

If only the translation, image plane rotation and zooming (scaling) are taken into account, the projective model can be further simplified to the following four-parameter model or similarity model with $m_0 = s \cdot \cos \varphi$, $m_1 = -s \cdot \sin \varphi$, $m_2 = a$, $m_3 = s \cdot \sin \varphi$, $m_3 = s \cdot \cos \varphi$, $m_5 = b$ and $m_6 = m_7 = 0$:

$$\begin{bmatrix} x' \\ y' \end{bmatrix} = \begin{bmatrix} s \cdot \cos\varphi & -s \cdot \sin\varphi \\ s \cdot \sin\varphi & s \cdot \cos\varphi \end{bmatrix} \begin{bmatrix} x \\ y \end{bmatrix} + \begin{bmatrix} a \\ b \end{bmatrix}, \quad (4)$$

where a, b, s, and $\varphi$ are respectively the horizontal shift, vertical shift, scaling and image plane rotation parameters.

In this work, we shall introduce efficient methods for estimating the affine model from depth maps with or without texture videos. We shall also describe an efficient method for implementing the affine transformation with significantly reduced arithmetic complexity. By using this transformation, one can predict the depth values of a depth image frame from others in adjacent time instants. More specifically, let $d_R(x,y)$ be the depth value at location (x,y) in a reference frame, which is coded or compressed already. The subscript R denotes the pixel values from the reference depth image frame. In addition, let $d_C(x,y)$ be the depth value at location (x,y) of the current depth map to be predicted for compression. Using the estimated motion model (1) or the simplified model (3) from the current and reference depth maps, one can use $d_R(x,y)$ as a predictor of $d_C(x', y')$ where (x,y) and (x', y') are related by (1) or its simplified forms.

For stationary or nearly stationary objects, the prediction error or residual $e(x', y') = d_C(x', y') - d_R(x,y)$ will usually be small as the camera motion model can usually model effectively the changes from the geometry relationship.

In case of moving objects or the presence of modeling errors in the camera motion model, (x,y) may need to be adjusted by adding a certain correction displacement/motion vector $(\Delta x, \Delta y)$ to (x,y) so as to minimize some measure $D(e(x', y'))$ of the prediction residual $e(x', y')$, $$\min_{(\Delta x, \Delta y)} D(e(x', y')), \; e(x', y') = d_C(x', y') - d_R(x + \Delta x, y + \Delta y). \quad (5)$$

Possible distortion measures include for example the absolute difference $$D(e(x',y')) = |d_C(x',y') - d_R(x+\Delta x, y+\Delta y)|, \quad (6)$$

or the squared difference $$D(e(x',y')) = (d_C(x',y') - d_R(x+\Delta x, y+\Delta y))^2. \quad (7)$$

To reduce the information to describe the correction motion vector $\Delta x$, $\Delta y$ in compression/coding applications, the depth image may be divided into blocks so that the pixels inside each block may share a single correction motion vector. The distortion measure D above will then consist of an appropriate sum of the distortion of the pixels inside each block.

Since the prediction residuals will usually assume a much smaller amplitude than the original depth pixel values, the number of bits required to approximate these residuals will usually be considerably smaller than their original values which leads to a more compact binary representation and hence data compression.

Estimation of the Motion Model Parameters

Figure 3A:
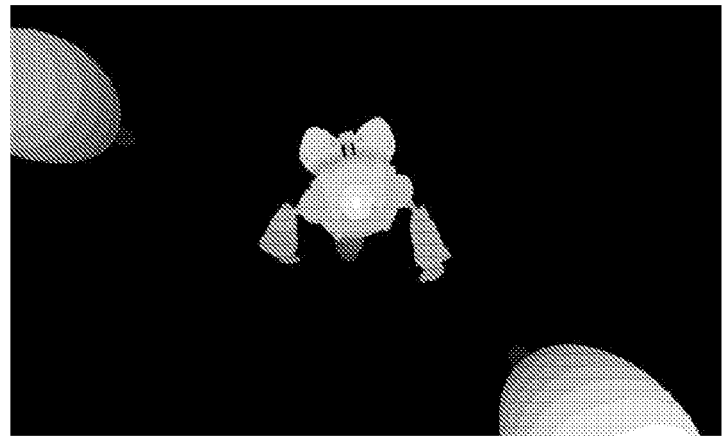
FIG. 3(a) is a reference depth map and FIG. 3(b) is a current depth map.
Figure 3B:
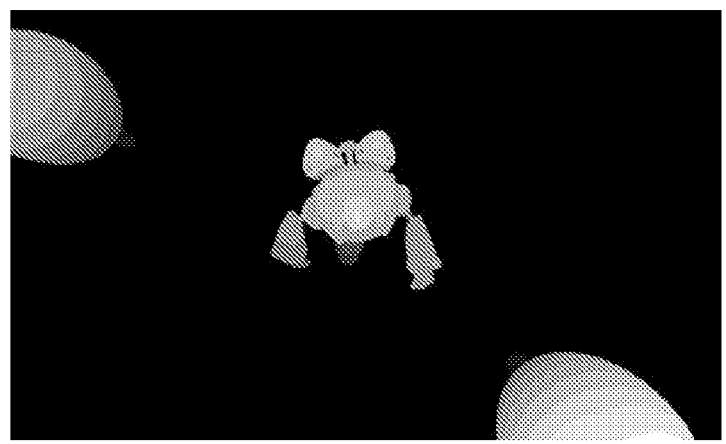

Given two depth images input as shown in FIG. 3 for an example, the objective is to identify a set of corresponding points $(x_i, y_i)$ and $(\hat{x}'_i, \hat{y}'_i)$, $i=1, \ldots, n$, respectively in the two depth maps, where n is the number of corresponding points, so that one can estimate the model parameters using (3).

More precisely, the errors in predicting $(\hat{x}'_i, \hat{y}'_i)$ using the model in both coordinates are respectively $$e_{i,x} = \hat{x}'_i - x'_i = \hat{x}'_i - m_0 x_i - m_1 y_i - m_2,$$

$$e_{i,y} = \hat{y}'_i - y'_i = \hat{y}'_i - m_3 x_i - m_4 y_i - m_5. \quad (8)$$

The distortion can be measured by means of a certain distortion measure, $\rho(e_i)$, of the modeling error $e_i = [e_{i,x}, e_{i,y}]^T$. By minimizing the total distortion measure, $D(m)$, of all the corresponding points, one can obtain the model parameters, $m_j$, $j=0$ to 5.

$$D(m) = \sum_{i=1}^{n} \rho(e_i), \quad (9)$$

where $m = [m_0, \ldots, m_5]^T$ is the parameter vector. Since the error is a linear function of the model parameters, if $\rho(e_i) = \|e_i\|_2^2 = e_{i,x}^2 + e_{i,y}^2$, then $D(m)$ is a quadratic function of the variables and $m = [m_0, \ldots, m_5]^T$ can be solved as a quadratic least square problem, which can be solved by solving a system of linear equations in 6 variables.

The described method aims to estimate the motion model parameters. It consists of the following steps: feature point extraction, feature matching for finding corresponding points in two images, and robust estimation of motion model parameters.

A. Efficient Feature Point Extraction

Given two depth maps, the objective is to obtain a set of feature points $(x_i, y_i)$, $i=1, \ldots, n$, in the current depth map, so that one can identify their corresponding feature points $(\hat{x}'_i, \hat{y}'_i)$, $i=1, \ldots, n$, in the reference depth map. To emphasize, if texture videos are available, feature points shall be also extracted from the current texture image to build the correspondence in the reference texture image. The feature correspondence shall be also included for the estimation of GMPs.

There are many methods to extract feature points in texture images, such as intensity-based parametric-based methods, and contour-based. Intensity-based method usually relies on a specific measurement matrix for feature extraction. See, C. Schmid et al., "Evaluation of interest point detectors," *International Journal of computer vision*, vol. 37, pp. 151-172, (2000), which is incorporated herein by reference in its entirety. However, using such a measurement matrix for feature point extraction on the entire image requires many multiplications, which may hinder its real time implementations. Parameter-based methods use a set of parameters to model the various geometric properties of the entity for feature point extraction. It can be noted the performance of a parameter-based method will be sensitive to the modeling parameters. Contour based methods use the information of the contour of the objects in the image for corner extraction. Chain code can be used. See, H. Freeman et al., "A corner-finding algorithm for chain-coded curves," *IEEE Transactions on Computers*, vol. 3, pp. 297-303, (1977). But, using chain code for feature detection is sensitive to the noise introduced by edge detection and only the corner points can be extracted, such as in N. Nain et al., "Morphological Edge Detection and Corner Detection Algorithm Using Chain Encoding," in Signal-Image Technologies and Internet-Based System, (2007), pp. 821-825. In other words, no corner points can be obtained if the objects in the image only contain smooth edge contours, which is common in depth maps.

To alleviate the above-mentioned problems, an efficient method, namely the Ramec-Douglas-Peucker-based (RDP-based) method, is used for better extraction of the feature points on depth maps or texture images.

The Ramer-Douglas-Peucker (RDP) algorithm is designed to reduce the number of points on a curve. See, U. Ramer, "An iterative procedure for the polygonal approximation of plane curves," *Computer graphics and image processing*, vol. I, pp. 244-256, (1972). The algorithm divides a specified curve in a recursive manner. For each recursion, given all the points between the first and last point, it automatically marks the first and last point to be kept. Based on the line segment with these two end points, the furthest point from the line segment will be picked out and marked as a kept point. The algorithm will terminate when the distance from the furthest point to the line segment is smaller than a threshold.

The RDP-based method for feature extraction on depth or texture images mainly includes three steps. More specifically, it first uses an edge detector to extract the edges of the image, such as canny edge detector. R Deriche, "Using Canny's criteria to derive a recursively implemented optimal edge detector," *International journal of computer vision*, vol. 1, pp. 167-187, (1987). Then the pixels on each edge will be traced and hence can be organized in an ordered manner. If there are junctions such as T conjunction or L conjunction, the traced edge will be separated into a set of individual edges. Furthermore, by taking each individual edge as a specific curve, a set of points on the edge curve can be extracted using RDP algorithm. These points will serve as feature points. Next we present an efficient realization of the RDP algorithm for feature point extraction.

It can be seen that the RDP algorithm requires the distance calculation of all the points lying between the start and end point. Let $P_1$ and $P_2$ be the start and end point of an individual curve with coordinates $(x_1, y_1)$ and $(x_2, y_2)$, respectively, and $P_0$ is an individual point on the curve with coordinate $(x_0, y_0)$. The distance from $P_0$ to the line segment represented by $P_1$ and $P_2$ can be gauged using $$dis(P_1, P_2; (x_0, y_0)) = \frac{|(y_2 - y_1)x_0 - (x_2 - x_1)y_0 + x_2 y_1 - y_2 x_1|}{\sqrt{(y_2 - y_1)^2 + (x_2 - x_1)^2}}. \quad (10)$$

To efficiently utilize the RDP algorithm, for each recursion, the point with the largest numerator in equation (10) can be chosen as the furthest point. Only at the end of the recursion, the distance of the furthest point measured by equation (10) will be used for the termination judgment. Hence, the calculation of the denominator and the division in equation (10) within each recursion will be omitted. Moreover, to further increase the efficiency, the calculation of the inverse square root $(\sqrt{(y_2-y_1)^2+(x_2-x_1)^2})^{-1}$ in equation (10) can be realized using some efficient techniques, e.g. using the fast inverse square root method in Ricardo et al., "Robust Statistics: Theory and Methods," J. Wiley, (2006).

Figure 4A:
FIG. 4(a) is an edge map of the current depth map and FIG. 4(b) is the extracted feature points superposed on the current depth map.
Figure 4B:

FIG. 4(b) shows an example of the extracted features on the edge image present in FIG. 4(a). Specially, if the extracted feature number is not enough, which is denoted as Case I the system will skip GMC and will perform frame differencing to detect the MMOs. The GMPs in equation (3) will be set to $m_0=m_4=1$ and $m_1=m_2=m_3=m_5=0$ (default values) and the compensated depth map will be set to the original reference depth map. Otherwise, feature matching will be performed.

Feature Matching

After sufficient feature points $(x_i,y_i)$, $i=1, \ldots, n$, are extracted from the current depth map or texture image, the next procedure is to find the corresponding feature points $(x_i,Y_i)$. $i=1, \ldots, n$, in its adjacent image over time (inter-frame) and/or over space (inter-view).

Template-based matching is employed here to find the correspondence of the feature points. L. L. Scharf, "Statistical signal processing," Reading, Mass.: Addison-Wesley, vol. 98, 1991.

More specifically, given a reference depth map d R(x,y) and a current depth map d(x,y) with its associated t feature points located at $(x_i, y_i)$, we first define a square patch centered at $(x_i,y_i)$ as the template $d_t(x_t, y_t)$, $x_t \in [1, N_t]$, $y_t \in [1, N_t]$, assuming the patch size is $N_t$. Then a square region centered at the same location $(x_i, y_i)$ in $d_R(x,y)$ is extracted to serve as the searching image $d_s(x_s, y_s)$, $x_s \in [1, N_s]$, $y_s \in [1, N_s]$. Here we assume the size of the searching image is $N_s$ with $N_s > N_t$. Finally, we move the template $d_t(x_t, y_t)$ inside the searching image $d_s(x_s, y_s)$ and the corresponding feature point position can be obtained by selecting the minimum sum of absolute difference (SAD) value over the whole area spanned by the template. More precisely, the absolute difference (AD) of pixel intensity can be defined as $$\text{diff}(x_s,y_s,x_t,y_t)=|d_s(x_s,y_s)-d_t(x_t,y_t)|. \quad (11)$$

Hence, the SAD for each pixel in the search image is $$SAD(x_s, y_s) = \sum_{m=1}^{N_t} \sum_{n=1}^{N_t} \text{diff}(x_s + m - 1, y_s + n - 1, m, n). \quad (12)$$

By looping through the pixels in the searching image, the best position of the corresponding feature point can be found with the lowest SAD score.

Robust Global Motion Parameter Estimation

As the estimated corresponding feature points from the two input depth maps or textured images may contain corresponding points from the moving objects or image noise, a robust method is required to handle these outliers.

To reduce the effect of these outliers in the estimation, robust statistical techniques should be used. Instead of using the squared error $\rho(e_i)=\|e_i\|_2^2=e_{i,x}^2+e_{i,y}^2$, which is sensitive to outliers, robust M-estimate function [Ricardo article] such as the Huber's function, Tukey's bisquare function, etc. can be used as the distortion measure $D(e_i)$. This leads to a nonlinear least square problem, which can be solved using the iterative reweight least squares method. M. A. Fischler et al., "Random sample consensus: a paradigm for model fitting with applications to image analysis and automated cartography," *Communications of the ACM*, vol. 24, pp. 381-395, (1981).

For texture videos, the Random Sample Consensus (RANSAC) algorithm in the Torr article, M-estimator Sample Consensus (MSAC) algorithm in a 2001 article by Chan, etc. are commonly used. See, S. C. Chan et al., "Multiplierless perfect reconstruction modulated filter banks with sum-of-powers-of-two coefficients," *IEEE Signal Processing Letters*, vol. 8, pp. 163-166, (2001). This involves randomly picking subsets of corresponding points and solving the resulting linear least square or nonlinear least squares problem. This yields a number of possible solutions and the one which best fits most of the corresponding points is chosen as the final solution.

Similar techniques can also be used to estimate the motion model parameters from the matched feature points obtained from the depth maps. If texture videos are available, then more corresponding points can be obtained and hence a similar distortion $$D'(m) = \sum_{i=1}^{n} \rho(e_i')$$

can be formed from these points. The final distortion can be obtained by appropriately summing the contributions from the depth and texture feature points.

$$D(m)=w_{text}D'(m)+w_{depth}D(m), \quad (13)$$

where $w_{text}$ and $w_{depth}$ are positive constants which can be used to control the relative important of the two terms, which are in turn related to the reliability of the texture and depth feature points.

Efficient Realization of Depth Compensation Using the Global Motion Model

A. Multiplier-Less Update of Imaging Coordinate

In performing motion compensation of the current depth image from a previously coded reference depth image, a correction vector may be needed in additional to the one predicted by the global motion model which minimizes some total distortion measures of the prediction error $e(x',y')$ for all pixels with location $(x', y')$ inside a given block B.

$$\min_{(\Delta x, \Delta y)} \sum_{(x',y') \in B} D(e(x', y')), \quad (14)$$

where $e(x', y') = d_C(x', y') - d_R(x + \Delta x, y + \Delta y)$.

Since $(x', y')$ lies on the integer grid points in the current depth image, its corresponding location $(x,y)$ predicted from the global motion model generally will not lie on an integer grid point. Moreover, $(\Delta x, \Delta y)$ may be up to a quarter-pixel resolution and hence the coordinates of the corresponding point in the reference image are in general fractional numbers. Therefore, the corresponding depth value $d_R(x+\Delta x, y+\Delta y)$ has to be interpolated from the integer-pel sampled depth map.

Efficient computation of this value requires the efficient computation of $(x', y')$ from $(x,y)$ and the efficient computation of the interpolated value at location $(x+\Delta x, y+\Delta y)$ from the integer-pel sampled depth map $d_R(n_x, n_y)$, where $n_x$ and $n_y$ are integers.

A description of an efficient method for computing $(x', y')$ from $(x,y)$ requires expressing $(x,y)$ in terms of $(x', y')$ using equation (2), which gives $$\begin{bmatrix} m_0 - m_6 x' & m_1 - m_7 x' \\ m_3 - m_6 y' & m_4 - m_7 y' \end{bmatrix} \begin{bmatrix} x \\ y \end{bmatrix} = \begin{bmatrix} x' - m_2 \\ y' - m_5 \end{bmatrix}, \quad (15)$$

-continued $$\begin{bmatrix} x \\ y \end{bmatrix} = \begin{bmatrix} m_0 - m_6 x' & m_1 - m_7 x' \\ m_3 - m_6 y' & m_4 - m_7 y' \end{bmatrix}^{-1} \begin{bmatrix} x' - m_2 \\ y' - m_5 \end{bmatrix} = \qquad (16)$$

$$\frac{1}{(m_0 - m_6 x')(m_4 - m_7 y') - (m_1 - m_7 x')(m_3 - m_6 y')}$$

$$\begin{bmatrix} m_4 - m_7 y' & -(m_1 - m_7 x') \\ -(m_3 - m_6 y') & m_0 - m_6 x' \end{bmatrix} \begin{bmatrix} x' - m_2 \\ y' - m_5 \end{bmatrix}.$$

This requires a considerable number of multiplications and divisions per location (x', y'), which makes real-time implementation complicated or difficult.

The use of the affine model considerably simplifies this computation since the resulting relation will be simplified to $$\begin{bmatrix} x \\ y \end{bmatrix} = M \begin{bmatrix} x' \\ y' \end{bmatrix} + \begin{bmatrix} m'_2 \\ m'_5 \end{bmatrix}, \qquad (17)$$

where $$M = \begin{bmatrix} m_0 & m_1 \\ m_3 & m_4 \end{bmatrix}^{-1} = \frac{1}{(m_0 m_4 - m_1 m_3)} \begin{bmatrix} m_4 & -m_1 \\ -m_3 & m_0 \end{bmatrix} \text{ and }$$

$$\begin{bmatrix} m'_2 \\ m'_5 \end{bmatrix} = M \begin{bmatrix} m_2 \\ m_5 \end{bmatrix}.$$

Since M does not depend on (x', y') as in the eight-parameter model, it can be precomputed only once and used for all (x', y'). Moreover, as (x', y') will usually lie in a rectangular block, neighboring locations will differ by (±1, 0) or (0, ±1). By using the linear relationship between (x', y') and (x,y) above, their corresponding locations (x,y), (x$_{(\pm 1,0)}$, y$_{(\pm 1,0)}$) and (x$_{(0,\pm 1)}$, y$_{(0,\pm 1)}$) respectively, are simply related by $$\begin{bmatrix} x_{(\pm 1,0)} \\ y_{(\pm 1,0)} \end{bmatrix} = M \begin{bmatrix} x' \pm 1 \\ y' \end{bmatrix} + \begin{bmatrix} m'_2 \\ m'_5 \end{bmatrix} = \begin{bmatrix} x \\ y \end{bmatrix} + M \begin{bmatrix} 1 \\ 0 \end{bmatrix} = \begin{bmatrix} x \\ y \end{bmatrix} \pm m_0, \qquad (18)$$

$$\begin{bmatrix} x_{(0,\pm 1)} \\ y_{(0,\pm 1)} \end{bmatrix} = M \begin{bmatrix} x' \\ y' \pm 1 \end{bmatrix} + \begin{bmatrix} m'_2 \\ m'_5 \end{bmatrix} = \begin{bmatrix} x \\ y \end{bmatrix} \pm M \begin{bmatrix} 0 \\ 1 \end{bmatrix} = \begin{bmatrix} x \\ y \end{bmatrix} \pm m_1,$$

where $m_0 = \frac{1}{(m_0 m_4 - m_1 m_3)} \begin{bmatrix} m_4 \\ -m_3 \end{bmatrix}$ and $m_1 = \frac{1}{(m_0 m_4 - m_1 m_3)} \begin{bmatrix} -m_1 \\ m_0 \end{bmatrix}$ are the columns of $M$.

Consequently, the new locations can be recursively updated from its neighboring values by two simple additions when the indices (x', y') are stepped through either along the horizontal or vertical directions, as $m_0$ and $m_1$ are already precomputed.

This efficiently computes the corresponding location of a depth pixel of the current frame in the reference frame according to the motion model. By interpolating the depth values from its integer-pel neighbors, one can obtain a predictor of the current depth pixel from the coded reference. If local refinement is required, one can search over ($\Delta x$, $\Delta y$) around (x,y) to obtain a better prediction. This will require the interpolation of the depth value of the reference image at (x+$\Delta x$, y+$\Delta y$).

Recursive computation of (x,y) using the above equations requires two sufficiently long accumulators which are able to accommodate the dynamic range of x and y respectively in order not to affect the required accuracy.

Normally, the precision of (x+$\Delta x$, y+$\Delta y$) required is up to a quarter of a pixel, i.e. $2^{-2}$. On the other hand, x and y can vary from 1 to $2^{12}$ for 4K images.

Therefore, the accumulator should have at least 12 integer bits plus two fractional bits. Furthermore, the accuracy of $m_0$ and $m_1$ should be determined as they may be accumulated by $2^{12}$ times. In the worse-case situation, their errors can be magnified by $2^{12}$ times. In order for these magnified errors not to affect the final accuracy of x and y, which is $2^{-2}$ for quarter-pel accuracy, the precision of $m_0$ and $m_1$ should be at least $2^{-2} \times 2^{-12} = 2^{-14}$.

For reliable operation, it is suggested that a 32-bit long accumulator be used for computing the values of x and y with a 16-bit integer part and a 16-bit fractional part. If positive x' and y' are used, then the integer part will be positive and sign bit is not required. The values of $m_0$ and $m_1$ can be represented in 16 to 32 bits with at least 14-bits for the fractional part.

B. Multiplier-Less Bilinear Interpolation

To compute the value of $d_R(x+\Delta x, y+\Delta y)$ from the reference depth image $d_R(n_x, n_y)$, the nearest four neighbors of (x+$\Delta x$, y+$\Delta y$) are located in the integer grid. If (x+$\Delta x$, y+$\Delta y$) is computed up to quarter-pel accuracy, it can be rounded up or down to the nearest integers to obtain the locations of its four neighbors. The corresponding lower limits are $x_L = \lfloor x+\Delta x \rfloor$ and $y_L = \lfloor y+\Delta y \rfloor$ and the upper limits are $x_U = \lceil x+\Delta x \rceil$ and $y_U = \lceil y+\Delta y \rceil$, where $\lfloor u \rfloor$ and $\lceil u \rceil$ denote respectively the smaller and larger integers nearest or equal to u. If one of the values x+$\Delta x$ or y+$\Delta y$ is an integer, then interpolation in the corresponding direction is not required. If both are integers, then the depth value can be obtained from the reference image directly.

Let the depth values of $d_R(n_x, n_y)$ at $(x_L, y_L)$, $(x_U, y_L)$, $(x_L, y_U)$ and $(x_U, y_U)$ be $f(0,0)$, $f(1,0)$, $f(0,1)$, and $f(1,1)$, respectively. Here, the unit square $[x_L, x_U] \times [y_L, y_U]$ has been mapped in the integer grid containing (x+$\Delta x$, y+$\Delta y$) to $[0,1] \times [0,1]$ for notation convenience.

If $d_R(u,v)$, $(u,v) \in [x_L, x_U] \times [y_L, y_U]$, is locally modeled by a bilinear function $f(u,v)$, then $d_R(x+\Delta x, y+\Delta y)$ can be approximated by $f(u,v)$ as $$f(x_\Delta + x_L, y_\Delta + y_L) = f(0,0)x_\Delta y_\Delta + f(1,0)(1-x_\Delta)y_\Delta + f(0,1)x_\Delta (1-y_\Delta) + f(1,1)(1-x_\Delta)(1-y_\Delta) \qquad (19)$$

where $(x_\Delta, y_\Delta) = (x+\Delta x - x_L, y+\Delta y - y_L)$.

If $x_\Delta$ and $y_\Delta$ are rounded to quarter-pixel accuracy, then they can take up values from $0, 2^{-1}, 2^{-2}, 2^{-1} + 2^{-2}$. The products $x_\Delta y_\Delta$, $(1-x_\Delta)y_\Delta$, $x_\Delta(1-y_\Delta)$ and $(1-x_\Delta)(1-y_\Delta)$ can be precomputed and there are at most 16 combinations for each of them. Each of these products can be written in canonical signed digits (CSD) or sum-of-power-of-two (SOPOT) coefficients in the form $$\sum_{l \in \{1,2,3,4\}} p_l 2^{-l},$$

where $p_l \in \{0, \pm 1\}$.

Consequently, the multiplication of a number u with $x_\Delta y_\Delta$, $(1-x_\Delta)y_\Delta$, $x_\Delta(1-y_\Delta)$ or $(1-x_\Delta)(1-y_\Delta)$ can be implemented as $$u \sum_{l \in \{1,2,3,4\}} p_l 2^{-l} = \sum_{l \in \{1,2,3,4\}} p_l (u \times 2^{-l}), \qquad (20)$$

which amounts to shifting u by $2^{-l}$ for each nonzero $p_l$ and adding them together. Thus, the bilinear interpolation in equation (16) can be implemented using additions only.

The principle also applies when $x_A$ and $y_A$ are rounded to b-bit accuracy. The products $x_A y_A$, $(1-x_A)y_A$, $x_A(1-y_A)$ and $(1-x_A)(1-y_A)$ again can be precomputed and there are at most $2^{2b}$ combinations for each of them.

For quarter-pixel accuracy, only 3-bits are used to quantize the $x_A$ and $y_A$ as follows:

$$x_{A,q} = (\text{round}(x_A \cdot 2^3))/2^3, \quad (21)$$

$$y_{A,q} = (\text{round}(y_A \cdot 2^3))/2^3. \quad (22)$$

where round(x) is the nearest integer to the number x. The products $x_A y_A$, $(1-x_A)y_A$, $x_A(1-y_A)$ and $(1-x_A)(1-y_A)$ can be precomputed in quarter-pixel accuracy as shown in Table I. The wordlength of these products for exact representation is only 4 bits.

In a special case of 1D interpolation, which means the bilinear function only has one variable $x_A$ or $y_A$, for example, if $x_A=0$, equation (19) can be re-written into $$f(x_L, y_A + y_L) = f(1,0) y_A + f(1,1)(1-y_A). \quad (23)$$

The positions need to be interpolated are located at $(x_L, y_A + y_L)$ and $y_A = 2^{-2}, 2^{-1}, 2^{-1} + 2^{-2}$, respectively, along the y-axis direction.

TABLE I

| Products in Quarter-pixel Accuracy | SOPOT Representation |
|---|---|
| 0 | 0 |
| 0.0625 | $2^{-4}$ |
| 0.1250 | $2^{-3}$ |
| 0.1875 | $2^{-3} + 2^{-4}$ |
| 0.2500 | $2^{-2}$ |
| 0.3750 | $2^{-2} + 2^{-3}$ |
| 0.5000 | $2^{-1}$ |
| 0.5625 | $2^{-1} + 2^{-4}$ |
| 0.7500 | $2^{-1} + 2^{-2}$ |
| 1 | 1 |

A hardware architecture can be used to realize the multiplication of an input number u with a SOPOT coefficient in equation (20) which is required in the bilinear interpolation in equations (19) and (23). See, T. Koga et al., "Motion-compensated interframe coding for video conferencing," Proc. NTC81, pp. G5.3.1-G5.3.5, (1981). Consider a SOPOT coefficient $$C = \sum_{i=1}^{n} p_{l_i} 2^{-l_i} = C_+ + C_- = \sum_{i=1}^{n_+} p_{l_i} 2^{l_i} + \sum_{i=1}^{n_-} p_{\bar{l}_i} 2^{-\bar{l}_i}$$

where $$p_{l_i} \in \{-1, 1\}, \; C_+ = \sum_{i=1}^{n_+} p_{l_i} 2^{l_i} \text{ and } C_- = \sum_{i=1}^{n_-} p_{\bar{l}_i} 2^{-\bar{l}_i}$$

denote the terms of C with positive and negative powers of 2, respectively. $l_i \geq 0$ and $\tilde{l}_i > 0$ are positive numbers with increasing magnitude as a function of i. We shall consider the multiplication of u with $C_+$ as the detail for $C_-$ is similar.

Let $s_k = \sum_{i=1}^{k} p_{l_i} 2^{l_i} u$ and $x_k = 2^{l_i} u$.

Then $s_{k+1} = s_k + p_{l_{k+1}}(2^{l_{k+1}} u) = s_k + p_{l_{k+1}} x_k 2^{l_{k+1}-l_k} = s_k + p_{l_i} x_{k+1}$, $x_{k+1} = x_k 2^{(l_{k+1}-l_k)}$ and $C_+ = s_{n_+}$.

Figure 5:
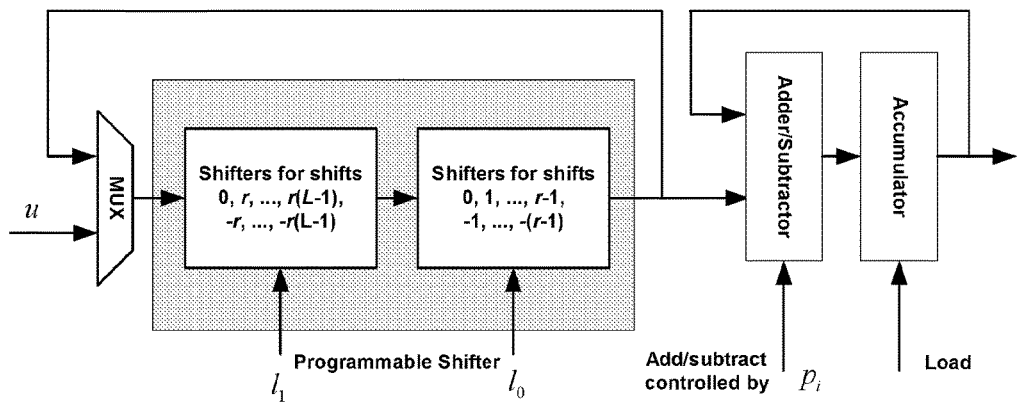
FIG. 5 is a block diagram showing the structure for multiplying an input with SOPOT coefficients.

Thus, the summation involved in $C_+ = s_{n_+}$ can be obtained by computing $s_{k+1}$ successively from the sum of $s_k$ and $p_{l_i} x_{k+1}$, where $x_{k+1} = x_k 2^{(l_{k+1}-l_k)}$ can be obtained by shifting the binary representation of $x_k$ to the left by $l_{k+1} - l_k$ bits. FIG. 5 shows such a structure for multiplying an input u with SOPOT coefficients. $s_{k+1}$ is recursively updated and stored in the accumulator. $x_{k+1}$ is stored in a register and is obtained by recursively shifting its previous content by $l_{k+1} - l_k$ bits before being added to ($p_{l_i}=1$) or subtracted from ($p_{l_i}=-1$) $s_k$ in the accumulator and the final sum $s_{k+1}$ stored in the accumulator.

The differential shift usually has a smaller range and can be implemented by a barrel shifter. To support larger shift range while avoiding using a large barrel shifter, the shift can be decomposed into more stages. FIG. 5 shows a two stage implementation where the required number of shift l is written as $l = r l_1 + l_0$, where $l_0 = 0, \ldots, r-1$ and $l_1 = 0, \ldots, L-1$. The maximum possible shift is thus $Lr-1$.

The first shifter performs a shift which is a multiple of r, while the second one performs a smaller range shift up to $r-1$.

When implementing the multiplication, appropriate control signals are used to control the shifters and addition/subtraction at the accumulator, which can be stored in a table when the required coefficient multiplication is invoked.

Figure 6A:
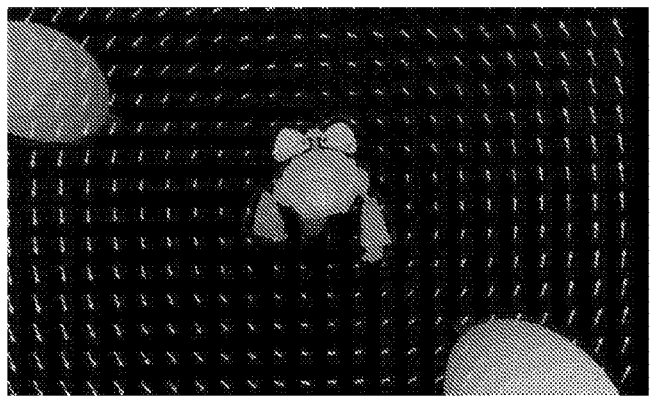
FIG. 6(a) shows estimated global motion in the current depth map and FIG. 6(b) shows the estimated depth map using the GMPs and efficient multiplier-less bilinear interpolation.
Figure 6B:
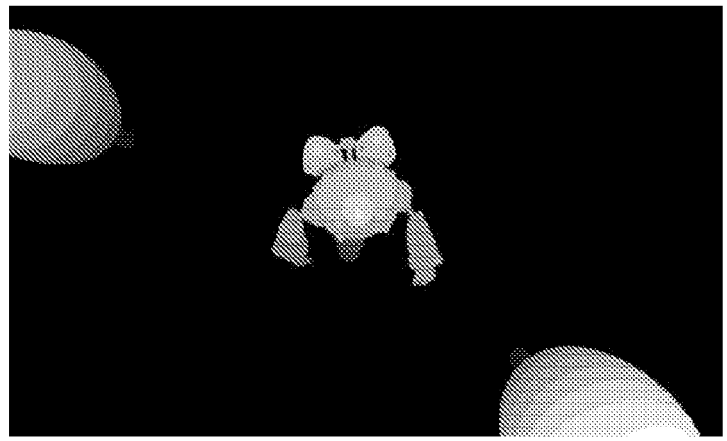

For an illustration, FIG. 6 shows the processed results using the current depth map in FIG. 3(*b*).

Detection and Estimation of MMOs and their Motion Parameters

If the current depth map d(x,y) can be modeled by the camera motion model in equation (3) and sufficient feature points can be found, then most of the depth values in the current depth map can be approximated by the compensated depth map $d_C(x,y)$, which is warped from the reference depth image $d_R(x,y)$ using GMPs. The objects, which are not effectively compensated, can be detected from the magnitude of the residuals after compensation by comparing it with a certain threshold $\varepsilon$. If it is smaller than this threshold, the compensation at this location is considered successful, which can be indicated by the following binary prediction mask $d_C^b$ $$d_C^b(x,y) = |d(x,y) - d_C(x,y)| < \varepsilon. \quad (24)$$

It can also be used to determine whether the compensation for the whole frame is effective. If so, it can also be used to detect the major moving objects (MMOs) and their motion model parameters, since they generally cannot be predicted by the global motion model.

To this ends, the total number of the successfully compensated pixels obtained by the using the GMP and default frame differencing are computed as follows:

$$\text{eff}_{rec} = \sum_{i=1}^{N_x} \sum_{j=1}^{N_y} d_C^b(x_i, y_i), \quad (25)$$

$$\text{eff}_{ori} = \sum_{i=1}^{N_x} \sum_{j=1}^{N_y} d_R^b(x_i, y_i), \quad (26)$$

where $\text{eff}_{rec}$ and $\text{eff}_{ori}$ are respectively the effectiveness of the GMP and the default frame differencing scheme, $$d_R^b(x,y) = |d(x,y) - d_R(x,y)| < \varepsilon \quad (27)$$

is the binary prediction mask of the default scheme, and $N_x$ and $N_y$ are respectively the number of columns and rows of $d_R^b(x,y)$. If $\text{eff}_{rec}$ is larger than $\text{eff}_{ori}$, the GMP-based compensation will be accepted and the motion model parameters (MMPs) of the MMOs will be estimated. Otherwise, the GMP-based compensation is considered unsuccessful, which is denoted by Case II. It is usually due to the presence of significant non-rigid temporal deformations. The previous depth map in the default frame differencing scheme will instead be used as the compensated depth map $d_C(x,y)$. The MMPs of the MMOs will also be estimated using the default compensation.

To identify the MMOs, the connected domains of the prediction mask are first labeled with different indices, which can identify each individual region in the mask. Then distance transformation is performed on the prediction mask. If the maximum distance for each individual region is smaller than the local searching range applied in LMC, the region will not be recognized as a MMO. Consequently, the small objects will be excluded and the MMOs together with their label indices can be extracted. Then different MMOs will be specified with different bounding boxes. Suppose the minimum/maximum image coordinates of a given MMO in the current depth map are respectively $(x_{min}, y_{min})$ and $(x_{max}, y_{max})$, a bounding box can be determined with the following horizontal and vertical sizes, $$N_x^{box} = x_{max} - x_{min} + 1, \quad (28)$$

$$N_y^{box} = y_{max} - y_{min} + 1. \quad (29)$$

To estimate the motion parameters of the image specified by the bounding box, template matching is further performed by taking the depth image in the bounding box as a template. Suppose the bounding region in the current depth map is $d(x,y)$, $x \in [x_{min}, x_{min}+N_x^{box}-1]$, $y \in [y_{min}, y_{min}+N_y^{box}-1]$, where $(x_{min}, y_{min})$ is the location of the upper left corner of the bounding box with horizontal width $N_x^{box}$ and vertical width $N_y^{box}$. For simplicity, the motion parameters include a displacement or motion vector and a scale change factor.

Let the corresponding bounding region in the depth map warped from reference depth map, $d_C(x,y)$ be $x \in [x_{min}+mv_x^{box}, x_{min}+mv_x^{box}+N_x^{box}-1]$, $y \in [y_{min}+mv_y^{box}, y_{min}+mv_y^{box}+N_y^{box}-1]$, where $(mv_x^{box}, mv_y^{box})$ is the motion vector obtained from template matching. Then, the depth scaling parameter is estimated from each matched bounding area in the depth maps. For instance, the scaling parameter $s_d^{box}$ can be estimated as $$s_d^{box} = \left( \sum_{y=y_{min}}^{N_y^{box}-1} \sum_{x=x_{min}}^{N_x^{box}-1} d(x,y) \right) \Big/ \left( \sum_{y=y_{min}+mv_y^{box}}^{N_y^{box}-1} \sum_{x=x_{min}+mv_x^{box}}^{N_x^{box}-1} d_C(x,y) \right). \quad (30)$$

If more than one MMO is detected, template matching is repeatedly performed to estimate the MMP. For each MMO, the elements of the MMP, $(x_{min}, y_{min}, mv_x^{box}, mv_y^{box}, s_d^{box})$, are first quantized, e.g. using a uniform quantizer. Then, the quantized values can be coded using entropy coding.

In the decoder, $d_C(x,y)$, $x \in [x_{min}+mv_x^{box}, x_{min}+mv_x^{box}+N_x^{box}-1]$, $y \in [y_{min}+mv_y^{box}, y_{min}+mv_y^{box}+N_y^{box}-1]$ in the GMP compensated depth map will be first scaled by $s_d^{box}$ to gauge the depth values of the reference bounding region, $$d(x,y) = s_d^{box} \cdot d_C(x,y), x \in [x_{min}+mv_x^{box}, x_{min}+mv_x^{box}+N_x^{box}-1], y \in [y_{min}+mv_y^{box}, y_{min}+mv_y^{box}+N_y^{box}-1]. \quad (31)$$

Then, the obtained bounding region in equation (31) will serve as the candidate blocks for local motion compensation of the region in the current depth map bounded with $x \in [x_{min}, x_{min}+N_x^{box}-1]$, $y \in [y_{min}, y_{min}+N_y^{box}-1]$.

Figure 7A:
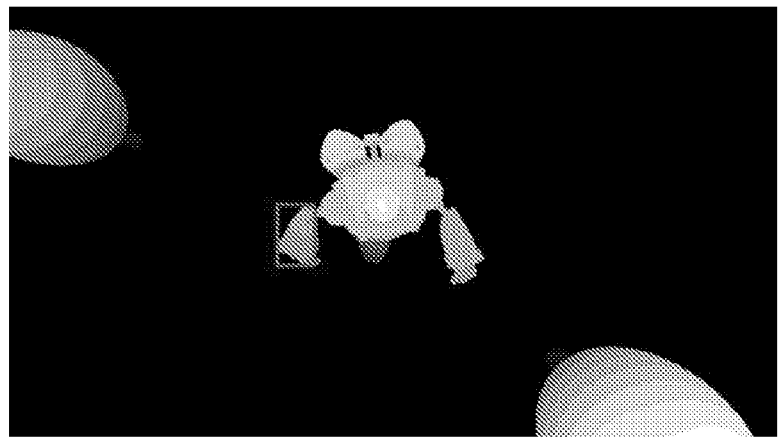
FIG. 7(a) shows the estimated major moving objects with bounding box in the reference depth map and FIG. 7(b) shows the corresponding bounding region in the current depth map.
Figure 7B:
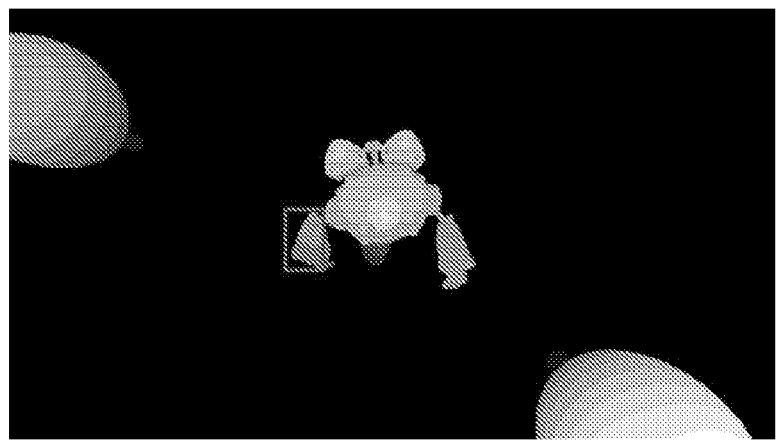

As a demonstration, FIG. 7 presents the estimated major moving objects and their corresponding bounding boxes.

Local Motion Correction (LMC) for Improved Compensation

The major motion object parameters provide the motion vector and scaling information of the entire major moving objects detected. The bounding box in the MMP associated with a MMO also provides the information where this motion vector and scaling information will be useful. In the coding of macroblocks or other coding units, if the bounding box in the MMP of a MMO covers a certain partition of the macroblocks or coding unit, then it can serve as a potential predictor for further local refinement. One or more MMPs may be available to the coding unit and the best predictor can be signaled to the receiver together with the refinement information, which may consist of a displacement or local motion vector, and scaling parameter, etc. With the bounding box approach, it is only required to specify which valid MMPs are used, instead of all the available MMPs in the frame, as most of them are associated with objects in other areas and hence are invalid for the current coding unit under consideration. The MMPs may also help to reduce the arithmetic complexity of finding the refinement information in, e.g., a motion estimation. Also, the range of the local motion vector is usually small and hence the bits for coding the latter can be significantly reduced. The MMPs may thus help to improve coding efficiency.

In the coding of a macroblock or coding unit, LMC is performed to find the best predictor from the compensated reference depth image using the GMPs. The valid MMPs can be used to provide an initial guess for local motion refinement, which consists of a displacement and a local deformation correction (LDC).

Conventional motion compensation alone may not be efficient as the object may be subject to local deformation. To achieve more precise motion compensation for each block, LMC is equipped with a discontinuity-aware motion estimation (DME) criterion and local deformation correction (LDC) is performed after major motion compensation. The basic idea in the DME criterion is to relax the matching accuracy around depth discontinuities so that candidate blocks can still be found under slight deformation. However, deformation in discontinuities is generally difficult to compensate. Fortunately, this can be corrected through the post processing technique, such as joint color-depth matting along depth discontinuities. See, K. V. Mardia et al., "Multivariate analysis," *Academic press*, (1979), which is incorporated herein by reference in its entirety. The change in depth values in a smooth area can also be compensated using the proposed LDC method.

A Local Motion Correction for Smooth Blocks

The conventional motion compensation methods equipped with LDC is adopted to deal with the smooth blocks. The conventional motion estimation using depth values in a small search range around a potential motion predictor is adopted to locate the best candidate block in the reference depth image. In conventional motion estimation, mean absolute difference (MAD) criterion is used to find out the best candidate block. See the Tech et al. article.

If the residual of the candidate block is large due to local deformation, then LDC will be performed to further reduce the prediction error.

Given the current and candidate blocks with depth values, respectively, given by $d(x_0+x, y_0+y)$ and $d_C(x_0+x+mv_x, y_0+y+mv_y)$, $(x,y) \in [0, N-1] \times [0, N-1]$, where $mv=(mv_x, mv_y)$ is a local motion vector (LMV) to be determined, it is assumed that the lower left corner of the current block is located at $(x_0, y_0)$ and a block size of N×N is used. $(x,y)$ serves to index the elements inside the block. Other block sizes may also be used. The candidate block is obtained from the compensated reference image $\tilde{d}_C(x_0+x, y_0+y) = A\{d_C(x_0+x, y_0+y)\}$ where $A\{\cdot\}$ and $d_C(x_0+x, y_0+y)$ denote the major object motion compensation operator and the global motion compensated reference image, respectively. The matching error is such as the following can be computed:

$$E_{x_0,y_0}(x,y;mv) = d(x_0+x, y_0+y) - d_C(x_0+x+mv_x, y_0+y+mv_y). \quad (32)$$

For notation convenience, we have omitted the subscript of $E_{x_0,y_0}(x, y; mv)$ in the sequel. To account for possible local deformation correction, a simple approximation of $E(x, y; mv)$ is sought. Since the bilinear function can be estimated and interpolated with low complexity, it is a good candidate for approximating the values of the matching error. The bilinear approximation function $\hat{f}(x,y)$ for $(x,y) \in [0, N-1] \times [0, N-1]$ can be written as:

$$\hat{f}(x, y) = \hat{f}(0, 0)\left(1 - \frac{x}{N}\right)\left(1 - \frac{y}{N}\right) + \hat{f}(0, N-1)\left(1 - \frac{x}{N}\right)\frac{y}{N} + \hat{f}(N-1, 0)\frac{x}{N}\left(1 - \frac{y}{N}\right) + \hat{f}(N-1, N-1)\left(1 - \frac{x}{N}\right)\left(1 - \frac{y}{N}\right), \quad (33)$$

where $\hat{f}(0, 0)$, $\hat{f}(0, N-1)$, $\hat{f}(N-1, 0)$ and $\hat{f}(N-1, N-1)$ at the four corners are the parameters which can be computed for example by least squares fitting. See, iResearch Consulting Group, 2015. *Q1 2015 China Online Video Report* (*Brief Edition*) [ONLINE] Available: http://www.iresearchchina.com/views/6431.html. To reduce the computation complexity, a simple and approximate method to determine these values is to estimate them directly by the median of $E(x, y; mv)$ in a 3×3 window centered at the desired locations.

Their values can be compressed or coded directly using DPCM or 2×2 transform coding followed by entropy coding.

By fitting $E(x, y; mv)$ with the bilinear function, an approximation $\hat{f}(x,y)$ is obtained and the residuals after compensation are $$\tilde{E}(x,y;mv) = E(x,y;mv) - \hat{f}(x,y). \quad (34)$$

The performance of the candidate motion vector can be measured by the mean absolute difference (MAD) of $\tilde{E}(x, y; mv)$ as $$MAD(mv) = \frac{\sum_{x=0}^{N-1} \sum_{y=0}^{N-1} |\tilde{E}(x, y; mv)|}{N^2}. \quad (35)$$

This allows us to compare the performance of each candidate LMV after bilinear compensation and determine the best one with the minimum value inside the given search range at the given location $(x_0, y_0)$.

B Local Motion Correction for Discontinuous Blocks

For blocks containing discontinuous, called discontinuous blocks, there may be large variations in the depth values around the depth discontinuities, which may affect the matching at the flat areas. The idea of the proposed DME is to relax the matching accuracy around depth discontinuities. Discontinuity detection such as edge detection is performed on the input depth map for identifying discontinuities for matching. The pixels within a certain distance of the discontinuities in the coding unit are indicated by a binary discontinuities structure mask (DSM), $D(x,y)$, which is equal to a one inside the mask and a zero otherwise. For the reference image before global camera motion compensation, edge detection has been performed in the feature detection step (step 1). The same GMP-based transformation described above can be applied to this edge map as in the depth images. Due to the interpolation, the depth map will become real-valued. To save storage, one can threshold the interpolated value to obtain a binary edge map.

When selecting the candidate blocks for matching, the candidate blocks will be selected only when they satisfy the following discontinuity compatible condition (DCC): the similarity between the discontinuities structure masks of the current and candidate blocks should be under a threshold. Thus, a structural match of the two blocks is performed in terms of their discontinuities structure using the above DCC. The similarity between the discontinuities structure masks can be determined by the following MAD criterion:

$$E_{D,(x_0,y_0)}(x, y; mv) = D(x_0 + x, y_0 + y) - D_C(x_0 + x + mv_x, y_0 + y + mv_y), \quad (36)$$

$$MAD_D(mv) = \frac{\sum_{x=0}^{N-1} \sum_{y=0}^{N-1} |E_{D,(x_0,y_0)}(x, y; mv)|}{N^2}, \quad (37)$$

where $D(x,y)$ and $D_C(x,y)$ are respectively the DSM of the current and compensated reference images, and $E_{D,(x_0,y_0)}(x, y; mv)$ is the matching error of the discontinuities structure masks of the current and candidate blocks. The similarity threshold can be adaptively obtained from the number of the non-zero elements in the discontinuities structure mask of the current block.

For those candidate blocks which satisfy the DCC, LDC will be used to evaluate its performance. Let $$\tilde{E}(x,y;mv) = E(x,y;mv) - \hat{f}(x,y), \quad (38)$$

be the compensated matching error. The performance of the candidate motion vector can be measured by the sum of absolute difference (MAD) of $\tilde{E}(x, y; mv)$ outside the discontinuity mask as $$MAD(mv) = \frac{\sum_{x=0}^{N-1} \sum_{y=0}^{N-1} (1 - D(x_0 + x, y_0 + y)) |\tilde{E}(x, y; mv)|}{N^2}. \quad (39)$$

This allows a comparison of the performance of each candidate LMV after bilinear compensation and a determination of the best one with the minimum value inside the given search range at the given location $(x_0, y_0)$. The bilinear function coefficient values can be compressed or coded directly using DPCM or 2×2 transform coding followed by entropy coding.

In the decoder, to reduce the blocking artifacts due to the block-based LMC, deblocking can be applied to the reconstructed depth maps, which is different from HEVC-3D in the Tech article where deblocking is not used.

Inter-View Prediction of Depth Maps from Multi-View Depth Videos

For interview prediction, the input depth maps or textured images in the system will be obtained from stereo or multi-view cameras. Since the temporal moving objects will share the same camera motion with that of the background for inter-view prediction, their features will be included for inter-view motion estimation in the system. Hence the performance of the system of the present invention for inter-view prediction and compensation will be more efficient than the inter-frame case. FIG. 8 gives an example using the system of the present invention for inter-view global motion estimation and compensation.

Figure 8A:
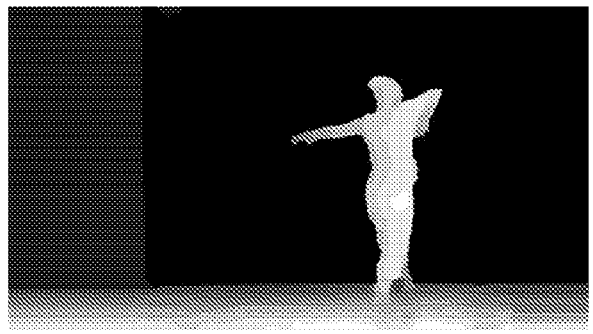
FIG. 8(a) shows a depth map input in left view.
Figure 8B:
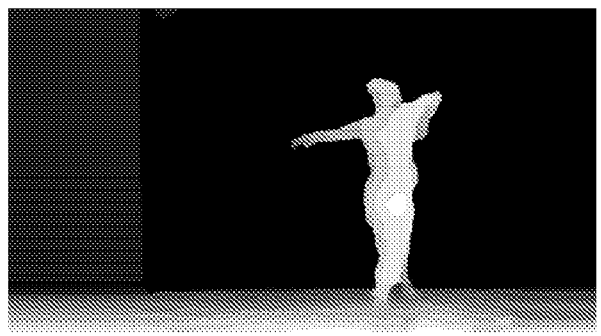
FIG. 8(b) shows a depth map in right view.
Figure 8C:
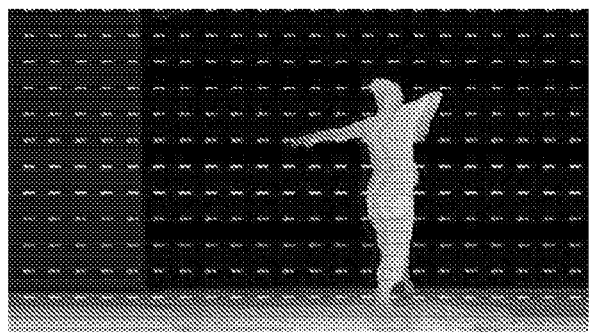
FIG. 8(c) shows the estimated global motion superposed on left view.
Figure 8D:
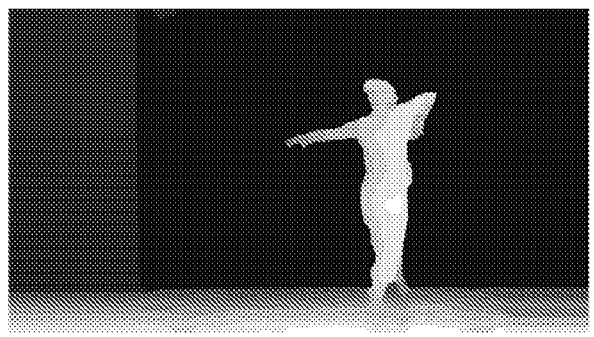
FIG. 8(d) shows the depth map wrapped from FIG. 8(a)
Figure 8E:
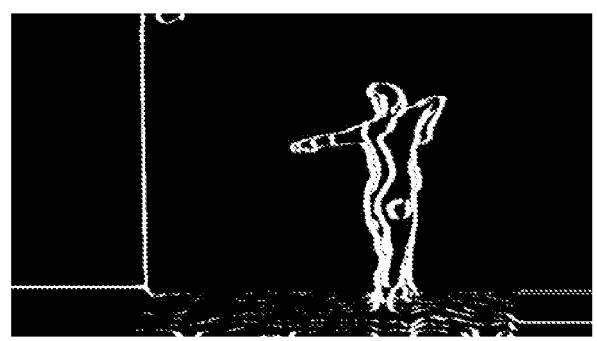
FIG. 8(e) shows the compliment of a prediction mask computed using default frame differencing and FIG. 8(f) shows the compliment of a prediction mask computed using the current and compensated depth maps.
Figure 8F:
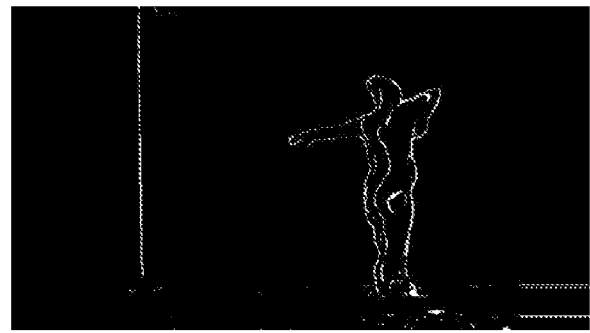

In FIG. 8(a) is a depth map input in left view (reference depth map); (b) is depth map in right view (current depth map); (c) is the estimated global motion superposed on left view, (d) is the depth map warped from (a); (e) is the compliment of prediction mask computed using default frame differencing; and (f) is the compliment of prediction mask computed using the current and compensated depth maps.

While the invention has been particularly shown and described with reference to preferred embodiments thereof, it will be understood by those skilled in the art that various changes in form and details may be made therein without departing from the spirit and scope of the invention. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all implementations falling within the scope of the appended claims, and equivalents thereof.

What is claimed:

1. A method for efficient estimation and realization of inter-frame global camera motion prediction and compensation of stationary or nearly stationary objects in videos having a reference depth map and a current depth map, comprising the steps of:
   detecting features in a depth map video using a modified Ramer-Douglas-Peucker algorithm;
   extracting the features;
   performing global motion compensation on the data from the current depth video followed by the reference depth video using template matching based on the features extracted,
   estimating global motion parameters using an M-estimator Sample Consensus method;
   detecting major moving objects in the depth video and estimating their parameters by comparing the current depth map and the compensated depth map from the reference image; and
   estimating the motion parameters denoted as major motion parameters, and local motion compensation of macroblocks or other coding/prediction units by dividing the current depth map into non-overlapping blocks and performing the local motion correction.

2. The method of claim 1 wherein the video includes texture images and the estimation is also based on an analysis of those texture images.

3. A system for global and major objects motion estimation, compensation and depth compression, comprising:
   a feature detector configured to receive at least a current depth map and a reference depth map, said feature detector acting to extract feature points from the maps and sets global motion compensation to its default values;
   a global motion compensator configured to receive feature points from said feature detector when the number of feature points extracted exceeds a threshold, said compensator acting to match features from the two maps, estimate the global motion compensation and apply compensation to the features based on the estimate;
   a motion detector configured to detect major moving object from the output of the compensator and estimate major motion parameters; and
   a local motion compensator configured to receive global motion compensation and major motion parameters from said motion detector and output coded video information.

4. The method of claim 1, wherein said compensated depth map is generated by wrapping said reference image by using either said estimated global motion parameters or a default global motion parameters.

5. The method of claim 1 further comprising a step of evaluating said global motion compensation by comparing a value derived from said estimated global motion parameters to a predetermined value.

6. The method of claim 5, wherein said predetermined value is derived from said reference depth map.

7. The method of claim 5, wherein said compensated depth map is generated by wrapping said reference image by using either said estimated global motion parameters or a default global motion parameters.

8. The method of claim 7, wherein if said global motion compensation is not effective, said compensated depth map is generated by wrapping said reference image by using said default global motion parameters.

9. The system of claim 3, wherein said compensation is based on either an estimated global motion parameters or a default global motion parameters.

10. The system of claim 9, wherein the global motion compensator is further configured to adopt said compensation based on said default global motion parameters if said estimated global motion compensation is ineffective.

* * * * *